United States Patent Office 3,187,036
Patented June 1, 1965

3,187,036
PROCESS FOR THE PRODUCTION OF O,O-DI-METHYL DITHIOPHOSPHORYL ACETIC ACID ALKYL AMIDES
Kosuke Yoshioka, Hirakata-shi, and Sadao Horie, Fuse-shi, Japan, assignors to Sumitomo Chemical Company, Ltd., Osaka, Japan, a corporation of Japan
No Drawing. Filed Oct. 22, 1962, Ser. No. 232,265
Claims priority, application Japan, Oct. 25, 1961, 36/38,811
2 Claims. (Cl. 260—461)

This invention relates to the production of dithiophosphoryl acetic acid alkylamides. More particularly, this invention relates to a process for the production of O,O,-dialkyl-dithiophosphoryl acetic acid monoalkylamide (or dialkoxyphosphinothioylthioacetic acid monoalkylamide) of the general formula

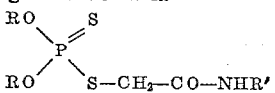

wherein R and R' individually represent lower alkyl radicals, which process comprises reacting dithiophosphoryl acetic acid of the general formula

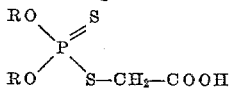

with alkyl isocyanate of the general formula R'—NCO, R and R' having the same meanings as the above.

The chemical reaction involved in the present invention will be represented by the following formulas:

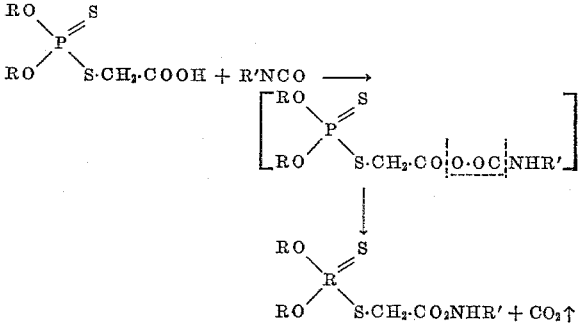

In accordance with the process of the present invention, dialkyl-dithiophosphoryl acetic acid is reacted with alkyl isocyanate thereby to form a mixed anhydride of dialkyl-dithiophosphoryl acetic acid and N-alkylcarbamic acid (the formula of which appears in parenthesis in the above formulas), and then, the said mixed anhydride is allowed to stand or warmed to have one molar equivalent of carbon dioxide dissipate therefrom thereby to obtain the corresponding dialkyl-dithiophosphoryl acetic acid alkylamide.

With respect to the production of dialkyl-dithiophosphoryl acetic acid alkylamide, there have been several known methods. One of the prior methods comprises condensation of the alkaline salt of dialkyl dithiophosphoric acid of the general Formula 4 with haloacetamide derivative of the general Formula 5 in accordance with the following reaction:

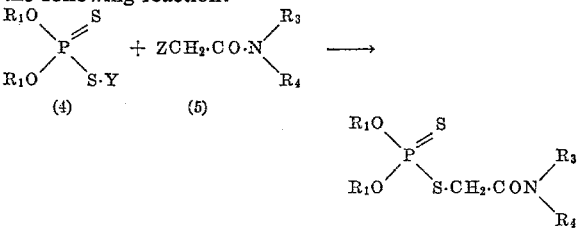

wherein $R_1$ means an alkyl radical, $R_3$ and $R_4$ mean hydrogen or alkyl radical, Y means an alkali metal, and Z means a halogen atom. This method is disclosed in U.S. Pat. 2,494,126. This method, however, suffers from the following unavoidable disadvantage. That is to say, where $R_3$ and $R_4$ are taken for hydrogen or lower alkyl radical, and particularly where $R_1$ is methyl radical, or where the alkaline salt of dimethyl dithiophosphorylic acid is used as a starting material, a disproportionation reaction occurs to give a large amount of O,O,S-trimethyl dithiophosphate (Formula 6), with formation of intended dialkyl-dithiophosphoryl acetic acid alkylamide in unsatisfactory yield.

Alternatively, it is also possible to have dialkyl-dithiophosphoryl acetic acid ester of the general Formula 7 react with an amine of the general Formula 8 thereby to obtain the corresponding ester (cf. DBP 1,076,662; Belg. P. 584,817).

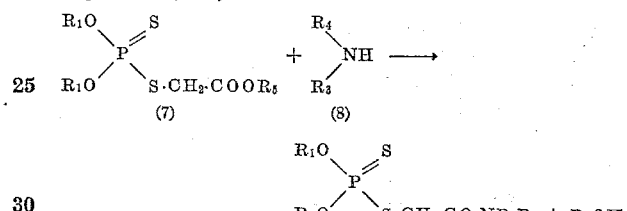

wherein $R_1$, $R_3$ and $R_4$ have the same meanings as the above-identified, and $R_5$ means an alkyl radical. However, this method is technically disadvantageous, because it fails to provide desired product in pure form and in an efficient manner in case where the ester residue $R_5$ of di-alkyl-dithiophosphoryl acetic acid ester is lower, and because it requires to maintain a low temperature for carrying out the intended reaction.

In accordance with still another method, a mixed anhydride of dialkyl-dithiophosphoryl acetic acid and cyclic ethylenedioxyphosphorous acid (Formula 9) is reacted with an amine to obtain the corresponding amide.

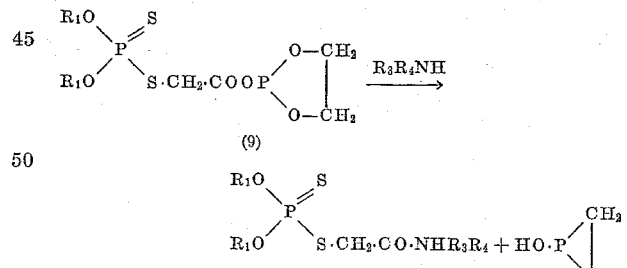

wherein $R_1$, $R_3$ and $R_4$ have the same meanings as mentioned above. In this method, the intermediate compound of the general Formula 9 has to be prepared by condensation of dialkyl-dithiophosphoryl acetic acid with ethylene chlorophosphite in the presence of a tertiary amine, according to the following equation:

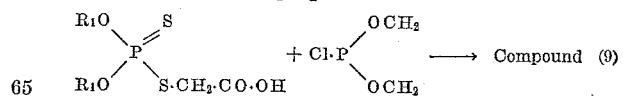

But this way is technically disadvantageous, because of necessity of a large amount of expensive materials, e.g. tertiary amine, cyclophosphonic chloride, etc. and of its insufficient yield for the corresponding ester.

In comparison with the aforementioned known methods, the process of the present invention allows us to make it possible to obtain desired product in a higher yield and in a more excellent purity through condensation of the alkali salt of dialkyl-dithiophosphoric acid with haloacetic acid, with splitting off alkali halide.

On the other hand, alkyl isocyanate can be easily obtained in good yield from aliphatic primary amine and phosgene.

Thus, an object of the invention is to provide a novel process for the production of O,O - dialkyl - dithiophosphoryl acetic acid monoalkylamides, which permits the obtainment of such compound in superior yield and with excellent purity compared to the conventional processes. Other objects would be apparent from the following descriptions.

In carrying out the reaction of the present invention in practice, a suitable solvent may be used. Suitable as solvents are aromatic hydrocarbons, e.g. benzene, toluene, etc.; halogenated hydrocarbons, e.g. carbon tetrachloride, methylene chloride, etc.; aliphatic hydrocarbon, e.g. hexane, etc.; and the other solvents inert to the reaction. If desired, it is possible to carry out the reaction in the absence of a solvent.

When dialkyl-dithiophosphoryl acetic acid is brought into reaction with alkyl isocyanate, decarbonation (removal of carbon dioxide) does not occur at a temperature below room temperature, so that the reaction product is maintained in the form of a mixed anhydride of dialkyl-dithiophosphoryl acetic acid and alkylcarbaminic acid. Upon heating the said mixed anhydride, decarbonation occurs smoothly.

If alkyl isocyanate is introduced while keeping the temperature of the reaction mass above 40° C., dialkyl-dithiophosphoryl acetic acid amide is formed with generation of carbon dioxide.

Thus, the reaction of the present invention requires no special conditions. Since the byproduct of the reaction is carbon dioxide gas, the reaction proceeds smoothly with spontaneous removal of the gas.

The termination of the reaction is confirmed by ceased evolution of the gas. In order for isolation of dialkyl-dithiophosphoryl acetic acid alkylamide from the reaction system, the solvent is distilled off directly or after the residual dialkyl-dithiophosphoryl acetic acid is completely removed by washing with an aqueous sodium bicarbonate solution.

Thus, dialkyl-dithiophosphoryl acetic acid alkyl-amide is obtained in a good yield, and this is very advantageous for working the process of the invention in commercial scale.

The product thus obtained is valuable as insecticide with little toxicity against human being.

The alkyl portion of dialkyl-dithiophosphoryl acetic acid used here may be methyl, ethyl, propyl, butyl or other lower alkyl, and the alkyl portion of alkyl isocyanate may be methyl, ethyl, propyl, isopropyl or other lower alkyl.

The following example serves to show the present invention in detail.

*Example*

Forty grams of dimethyl-dithiophosphoryl acetic acid is dissolved in 40 cc. of dry benzene, and 12 g. of methyl isocyanate is added dropwise a temperature lower than 30° C. After warming up to 40°–45° C., smooth decarbonation occurs. Warming is continued for another period of about 30 minutes while temperature of 50° C. is kept.

The reaction mixture is washed with 7% aqueous sodium bicarbonate solution and then with water until the mixture is freed from alkaline substance. Under a reduced pressure, benzene is evaporated therefrom.

Colorless, transparent oily material, 30 g., is obtained. After cooling it, a wholly crystalline solid material melting at 49.0° C.–50.5° C. is obtained. Yield of dimethyl-dithiophosphoryl acetic acid monomethylamide is 71%.

What we claim is:

1. A process for the production of O,O-dimethyl-dithiophosphoryl acetic acid monoalkylamide of the formula

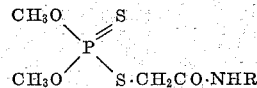

wherein R is lower alkyl, which process comprises reacting O,O-dimethyl-dithiophosphoryl acetic acid of the formula

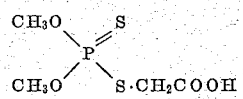

with alkyl isocyanate of the formula

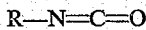

wherein R has the same meaning as above.

2. A process according to claim 1, where in the reaction is carried out in the presence of a solvent inert to the reaction.

References Cited by the Examiner

Saunders et al.: "Chemical Reviews," vol. 43, pages 203–218 (1948).

CHARLES B. PARKER, *Primary Examiner.*

IRVING MARCUS, *Examiner.*